United States Patent [19]

Kroll et al.

[11] Patent Number: 4,956,877
[45] Date of Patent: Sep. 11, 1990

[54] OPTICAL FIBER REFLECTIVE SIGNAL MODULATION SYSTEM

[75] Inventors: Mark W. Kroll, Minnetonka; Mark R. Pommrehn, Eden Prairie, both of Minn.

[73] Assignee: Cherne Medical, Inc., Edina, Minn.

[21] Appl. No.: 60,740

[22] Filed: Jun. 10, 1987

[51] Int. Cl.$^5$ .......................................... H04B 10/00
[52] U.S. Cl. ................................ 455/605; 455/603; 455/607
[58] Field of Search .............. 455/605, 603, 606, 607; 340/870.28, 870.29, 505, 825.54; 370/3

[56] References Cited

U.S. PATENT DOCUMENTS

| | | | |
|---|---|---|---|
| 3,691,484 | 9/1972 | Dore | 332/7.51 |
| 4,032,843 | 6/1977 | Loucks | 324/96 |
| 4,096,380 | 6/1978 | Eichweber | 455/605 |
| 4,207,460 | 6/1980 | Hudak et al. | 455/612 |
| 4,369,524 | 1/1983 | Rawson et al. | 455/606 |
| 4,479,264 | 10/1984 | Lockett et al. | 455/605 |
| 4,523,099 | 6/1985 | Lavine | 250/551 |
| 4,543,961 | 10/1985 | Brown | 370/3 |
| 4,545,076 | 10/1985 | Biard et al. | 455/612 |
| 4,642,804 | 2/1987 | Personick | 455/605 |
| 4,658,394 | 4/1987 | Cheng et al. | 455/605 |
| 4,662,003 | 4/1987 | Eichweber | 455/605 |

FOREIGN PATENT DOCUMENTS 8702531 4/1987 PCT Int'l Appl. ................ 455/605

OTHER PUBLICATIONS

Cheng et al., "Subscriber Loop Architecture;" *A.T.T. Technical Digest;* No. 75, Sep. 1984, pp. 9–10.
1984; Yokogawa Hokushin Electric Corp.; Optically–powered Transducer with Optical-Fiber Data Link; Publication in SPIE, vol. 478.

*Primary Examiner*—Joseph A. Orsino
*Assistant Examiner*—L. Van Beek
*Attorney, Agent, or Firm*—Anthony G. Eggink; Joel D. Skinner

[57] ABSTRACT

The device of the present invention provides a signal modulation system. The system has a first station communicatively connected to an optical fiber. The first station has a transmitter to produce an unmodulated light carrier signal through the optical fiber and a receiver to convert a modulated light signal received from the optical fiber to a demodulated electrical signal for output. The system also has a second station communicatively connected to the optical fiber. The second station has an amplifier and power source which receive input carrier modulating signals, a modulation circuit, and an electro-optical reflector constructed and arranged to modulate reflection of the carrier signal emitted from the transmitter to the receiver via the optical fiber.

31 Claims, 4 Drawing Sheets

OPTICAL FIBER REFLECTIVE SIGNAL MODULATION SYSTEM

BACKGROUND OF THE INVENTION

This invention relates to a system for modulating signals, and more particularly, to an optical fiber reflective signal modulation system. The reflective signal modulation system is particularly useful for sending a modulated signal from a remote location electrically removed from the carrier signal source.

The optical fiber reflective signal modulation system is useful for the transmission of signals from remote locations where electrical power sources are not desired. For example, in medical diagnostic procedures as well as in combustable environments, it is desired to minimize the use of power supplies at specific locations.

In the past, a variety of systems, and in particular, communication systems, have used signal modulation to convey information. These signal modulation systems have generally been comprised of transmitters for data input and separate receivers for data output. The transmitter and receiver may be linked by conductors, radio waves or a fiber optic link. The transmitter has an input to receive the modulating signal, a carrier source and a modulator, while the receiver has a demodulator and output circuitry. Typically, the modulating signal modulates the carrier source via the modulator to produce a modulated carrier signal. The modulated carrier is then transmitted to the receiver for demodulation.

In the transmitter, both the carrier source and the input require a power supply to function. However, it is often desirable to minimize power supply connections at the signal input location. For example, in electronic medical apparatus such as electrocardiographic equipment, safety requires that the patient be isolated from contact with current from the equipment's power supply. Thus, in a signal modulation system for electrocardiographic equipment, it is critical to minimize power supply connections to the signal input location on the patient's body. Such a requirement is obviously desirable in other areas of art.

Although prior art optical fiber data transmission systems meet some of the requirements discussed above, inherent problems remain, including, but not limited to the lack of a broad band modulation means, system power efficiency, signal transmission efficiency, carrier source power supply isolation, and the provision of a low signal input system power supply. Further, the desired signal modulation system for purposes of this invention must be simple, compact, easy to manufacture and must require low maintenance.

Despite the need for an efficient, broad band signal modulation system which is useful for inputting a modulating signal at a location electrically removed from carrier source power supplies, and which overcomes prior art problems and limitations, none insofar as is known has been proposed or developed.

Accordingly, it is an object of the present invention to provide an optical fiber reflective signal modulation system for providing a modulating signal at low or minimum power at a location electrically removed from a location having the carrier signal source and which provides output of a demodulated signal. It is another object of this invention to provide a broad band signal modulation system. It is yet a further object of this invention to provide a signal modulation system that is uncomplicated and thus easy to manufacture and easy to maintain.

SUMMARY OF THE INVENTION

The device of the present invention provides a new and unique signal modulation system. The optical fiber reflective signal modulation system has an optical fiber, and a first station communicatively connected to the optical fiber. The first station has means to transmit an unmodulated light carrier signal through the optical fiber and first means to convert a modulated light carrier signal emitted from the optical fiber to a demodulated electrical output signal. The first station also has means to separate the unmodulated carrier signal and the modulated carrier signal.

The system also has a second or remote station communicatively connected to the optical fiber. The second station has means to receive an input electrical carrier modulating signal or signals, second means to convert the electrical carrier modulating signal to an optical modulating signal, and an electro-optical reflector which modulates reflection of the light carrier signal emitted from the transmitter to the receiver via the optical fiber as a function of the optical modulating signal. The second station also has means to direct the light carrier signal emitted from the optical fiber.

The means to receive carrier modulating signals comprises at least one terminal, an amplifier connected to the terminal and to the second means to convert, and a power source connected to the amplifier.

The power source is comprised of a battery or ore or more photovoltaic cells constructed and arranged to receive light energy from the carrier signal. The photovoltaic cells may be transparent so that the carrier signal will transmit through the cells or, alternatively, the power source may additionally comprise a beam splitter constructed and arranged to partially reflect or transmit the carrier signal to the photovoltaic cells. Alternatively, a second optical fiber is provided to supply continuous light power to directly illuminate the photovoltaic batteries.

The electro-optical reflector comprises a high speed optical shutter disposed at the end of the optical fiber. The second means to convert is a modulation circuit connected to the optical shutter and to the amplifier. The second means to convert is operative on the optical shutter.

The first means to convert comprises a photodetector, an output circuit, and an electrical signal demodulator. The means to transmit comprises a LASER diode and a power supply. The means to separate comprises a partially reflecting mirror constructed and arranged to transmit the unmodulated carrier signal from the means to transmit to the fiber optic cable and to reflect the modulated carrier signal from the fiber optic cable to the first means to convert. And, the system of this invention provides additional configurations for optical fiber reflective signal modulation.

These and other benefits of this invention will become clear from the following description, by reference to the drawings.

DESCRIPTION OF THE PREFERRED EMBODIMENTS

The present invention provides a signal modulation system for input of a modulating signal at a location which is electrically removed and isolated from the location at which both a carrier signal is generated and a signal having the same characteristics as the modulated signal is outputted. The modulation system also provides a low or "zero" power signal input or remote location for receiving modulating signals and for transmitting the modulated signal.

Figure 1:
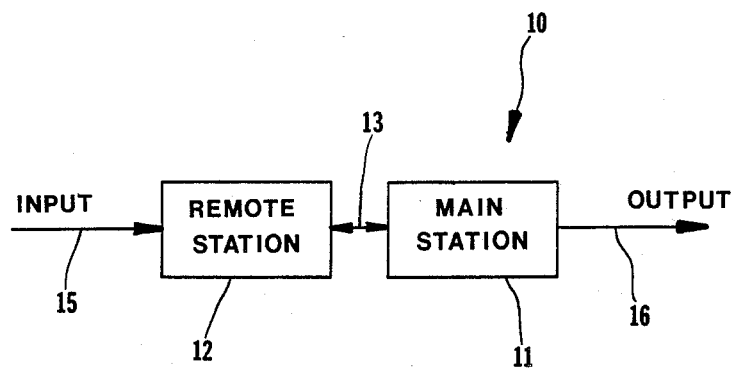
FIG. 1 is a schematic diagram showing the optical fiber reflective signal modulation system of the present invention.

Referring to FIG. 1, the optical fiber reflective signal modulation system 10 of the present invention comprises a main or first station 11 and a remote or second station 12. The main and remote stations 11 and 12 are communicatively connected by a fiber optic cable 13. The fiber optic cable 13 is preferably a high power, plastic optical fiber, such as that manufactured by Ensign-Bickford Industries, Inc., Simsbury, Conn. However, other fiber optic cables can also be utilized to practice the teachings of this invention.

The remote station 12 receives electrical input modulating signals 15. The input signals 15 may arise from electrical, acoustic or electromagnetic signals generated from various sources. The input signals 15 are processed in the remote station 12 to modulate an optical carrier signal which is originally transmitted from the main station 11 via the fiber optic cable 13. The modulated carrier signal is then transmitted via the cable 13 to the main station 11. The main station 11 then provides demodulated output electrical signals 16.

Figure 2:
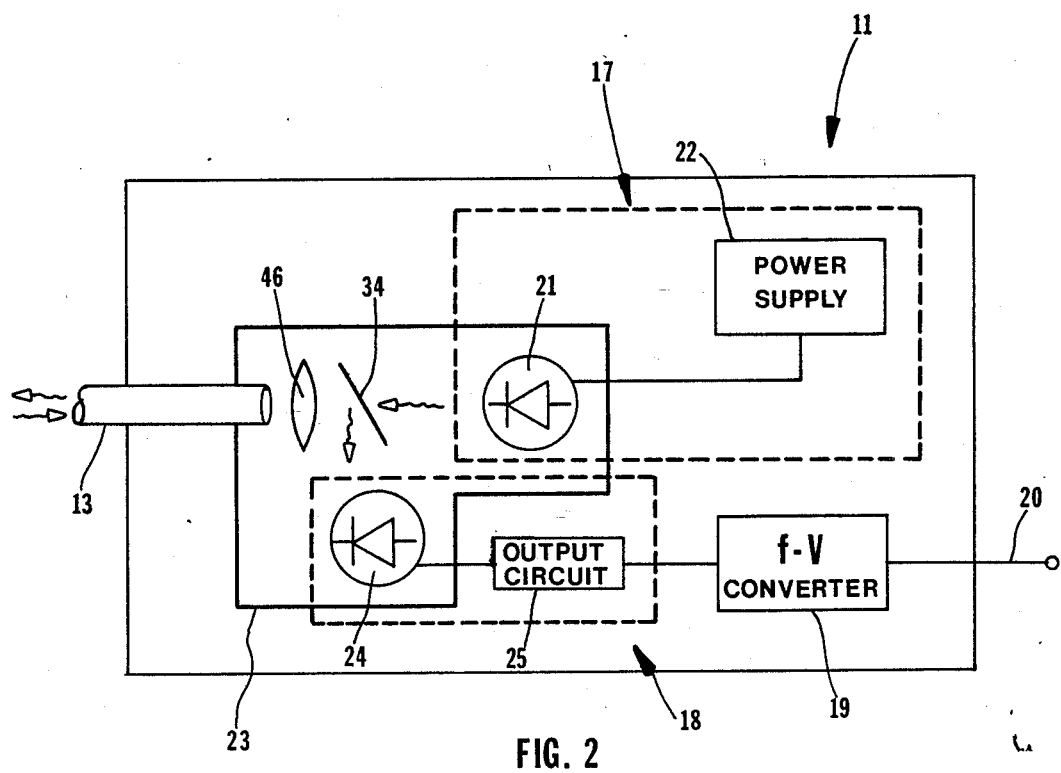
FIG. 2 is a schematic diagram showing the main station of the modulation system and its components.

Referring to FIG. 2, the main station 11 comprises an optical transmitter 17, a receiver 18, a demodulator 19, an output terminal 20 and a carrier signal separator 34. The transmitter 17 generates a constant, unmodulated light beam which is utilized as the carrier signal in the modulation system 10. The transmitter 17 comprises s light source 21 and a power supply 22. The transmitter 17 arrangement shown does not require modulation by any other internal circuitry or outside system.

The source 21 is an electro-optical transducer, preferably a laser diode, which converts electrical current into light energy. Two examples of such a laser diode are the Mitsubishi ML 5101 and ML 5401, manufactured by Mitsubishi Electronics America. Inc.. Sunnyvale. Calif. The source 21 must be powerful enough to deliver adequate carrier signal optical energy to the receiver 18 and within a broad wavelength range of from approximately 400 to 1,000 nanometers. The source 21 is connected to the fiber optic cable 13 by a cable connector 23 known in the art. The connector 23 should provide efficient coupling of light between the source 21 and the optical fiber cable 13. The power supply 22 is connected to the source 21 and provides current thereto. The power supply 22 is preferably internal to the main station 11 of the modulation system 10. Alternatively, the power supply 22 may be external to the system, for example, being derived from a connected system such as an electrocardiographic apparatus which processes the output 16 shown in FIG. 1.

The receiver 18 converts modulated optical carrier signals into modulated electrical signals. The modulated carrier signal is received by the receiver 18 from the optical fiber cable 13. The receiver 18 comprises a light detector 24 and an output circuit 25.

The detector 24 is an optical transducer, preferably a semiconductor photodiode which converts light energy into electrical signals. Alternatively, the detector 24 may be a phototransistor, or an integrated or hybrid device. The detector 24 is connected to the fiber optic cable 13 by the cable connector 23. The output circuit 25, which is connected to the detector 24, amplifies the modulated electrical signal from the detector 24 and rebuilds and conditions it to a usable shape and form. The output circuit 24 has preamplifiers, pulse reshapers and current to voltage converters which are known in the art.

The demodulator 19 is preferably a frequency to voltage converter which is shown connected to the output circuit 25. The demodulator 19 converts the modulated electrical signal from the output circuit 25 into an electrical signal having the same characteristics as the input modulating signal 15 as discussed with respect to FIG. 1. The output terminal 20 is connected to the demodulator 19. It transmits the demodulated output electrical signal from the demodulator 19 to other apparatus which are connected thereto, such as display means, printers and signal analysis means such as an ECG unit.

The carrier signal separator 34 separates the unmodulated carrier signal (transmitted from the source 21) from the modulated carrier signal emitted from the cable 13. The carrier signal separator 34 is preferably a partially reflecting mirror, known in the art. It is disposed within the cable connector 23. The carrier signal separator 34 is constructed and arranged to transmit the unmodulated carrier signal from the source 21 to the cable 13 and to reflect the modulated carrier signal emitted from the cable 13 to the detector 24. The main station 11 also preferably has a collimating lens 46 disposed adjacent to the fiber optic cable 13 to focus the unmodulated carrier signal generated by the source 21 toward the cable 13 and to focus the modulated carrier signal emitted from the cable 13 toward the carrier signal separator 34.

Figure 3:
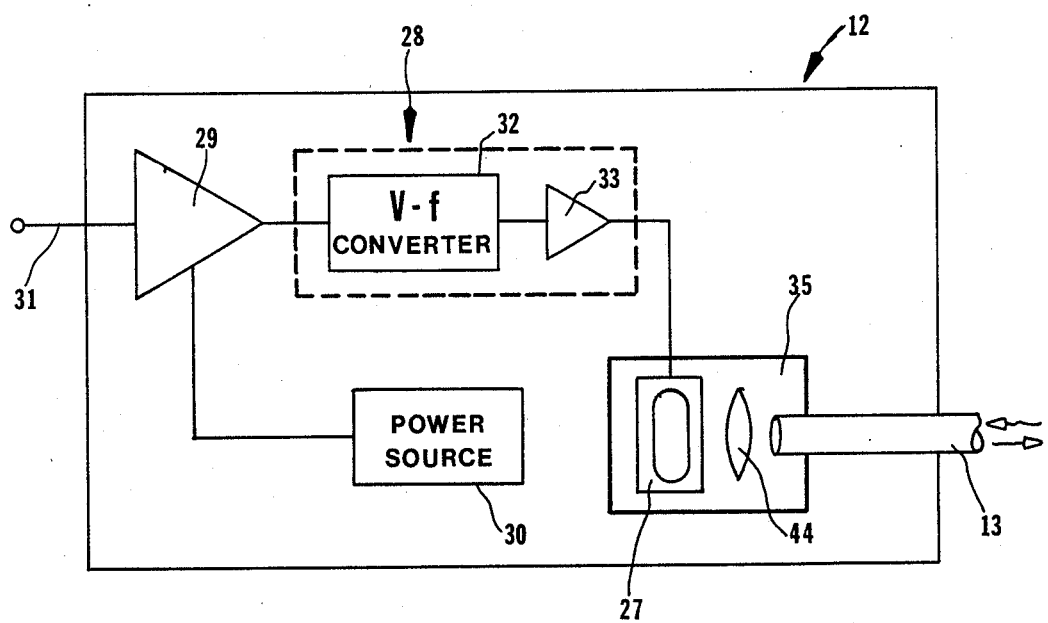
FIG. 3 is a schematic diagram showing the remote station of the modulation system and its components.

Referring to FIG. 3, the remote station 12 comprises an electro-optical reflector 27, a bit serial digital modulator 28, an amplifier 29, a power source 30, an input terminal 31, and a collimating lens 44. The input terminal 31 receives electrical signals, representing acoustical, electrical or electromagnetic signals, which are utilized as a carrier modulating signal in the modulation system 10. The input terminal 31 may be connected to a transducer, data acquisition system, computer system, communications system or other signal sources.

The amplifier 29 is connected to the input terminal 31 and amplifies input signals. Preferably, the amplifier 29 is a Burr Brown 102 amplifier, which is a type of low power amplifier having a current requirement in the range of from 500 microamps to 1.5 milliamps. The power source 30 is connected to the amplifier 29 and provides power for signal amplification. The bit serial digital modulator 28 is connected to the amplifier 29. The modulator 28 converts the carrier modulating signal from the amplifier 29 into an optical modulating signal which is an electrical signal having the desired characteristics to modulate the optical carrier signal. The modulator 28 preferably comprises a voltage to frequency converter 32 and a voltage amplifier 33.

The electro-optical reflector 27 is a fast action optical shutter which switches the reflection of light on and off in the frequency range of from 200 to 200,000 cycles per second. Preferably, the optical shutter 27 is a uniaxial birefringent liquid crystal. Alternatively, Pockel cells and Kerr cells known in the art function suitably for modulation purposes. These light reflectors provide truly broad band carrier signal modulation and the source 21 need not be spectrally matched to them.

The optical shutter 27 is physically disposed at the egress aperture of the fiber optic cable 13 by a cable-shutter connector 35, also known in the art. The cable-shutter connector 35 arranges the optical shutter 27 for controlling reflection of light energy back to the cable 13. Preferably one or more collimating lenses 44 are disposed within the connector 35 to reduce scattering of emitted light and to focus the reflected light beam for transmission to the fiber optic cable 13.

The optical shutter 27 is communicatively connected to the modulator 28. The optical shutter 27 operates at a set frequency in the absence of a carrier modulating signal from the amplifier 29. In this mode, the reflection of the emitted carrier signal back to the optical fiber cable 13 is modulated by the optical shutter 27 at the same fixed frequency. The fixed frequency modulated carrier signal is then transmitted via the optical fiber cable 13 to the detector 24. The optical shutter 27, however, is responsive to the optical modulating signal from the modulator 28. And, in its activated mode, the optical shutter 27 modulates the carrier signal by controlling or varying the frequency of its reflection to the optical fiber cable 13. The frequency of this controlled reflection is a function of the carrier modulating signal received at the input terminal 31.

Referring again to FIG. 2, the modulated optical carrier signal is then converted to a modulated electrical carrier signal by the receiver 18. The demodulator 19 then provides an output electrical signal from the main station 11 which is a function of the input signal at the remote station 12.

Figure 4:
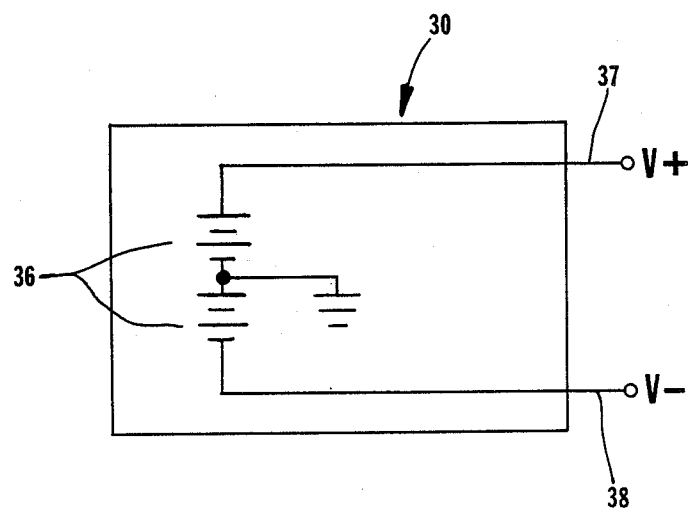
FIG. 4 shows an embodiment of the power supply utilized in the remote station of FIG. 3.

FIG. 4 shows one embodiment of the power source 30 of the remote station 12 shown in FIG. 3. This particular power source 30 has two batteries 36 and two voltage terminals 37 and 38. This embodiment provides reflective optical fiber signal modulation with low power at the remote station 12. However, the use of batteries to power the input features of the remote station 12 presents a rather bulky configuration and requires battery maintenance.

Figure 5:
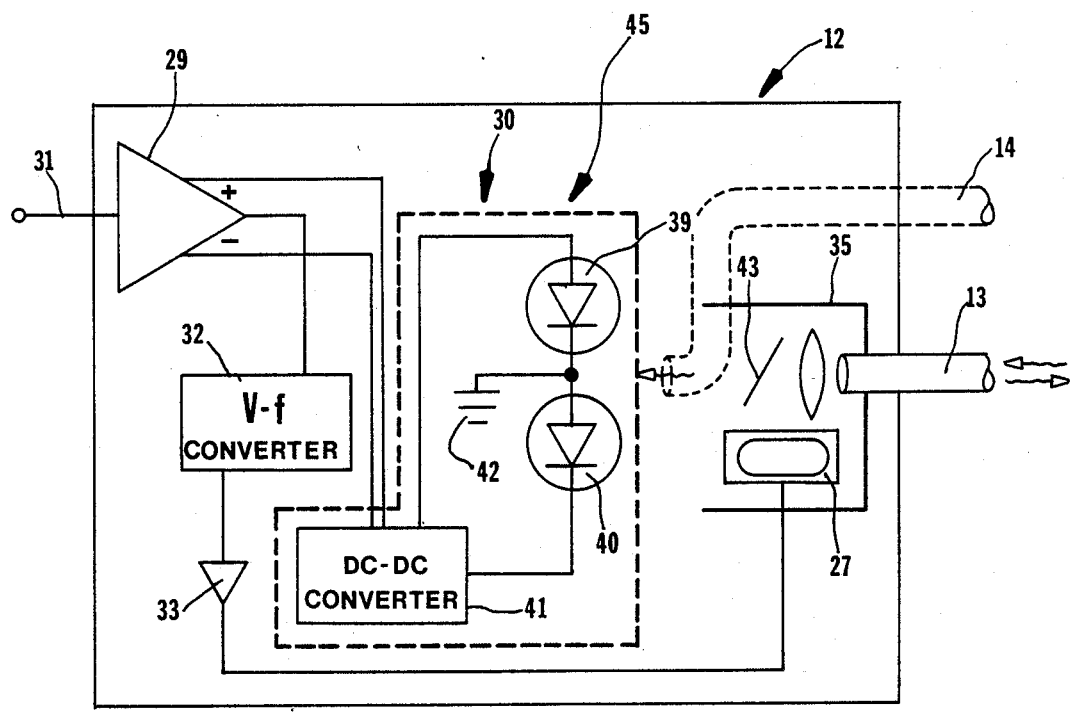
FIG. 5 is a schematic diagram showing a particular embodiment of the remote station and which utilizes another power supply embodiment.

FIG. 5 shows a preferred embodiment of the power source 30. The power source 30 comprises a beam splitter 43, a photovoltaic battery 45, and a DC to DC converter 41. The beam splitter 43 is preferably a partially reflecting mirror known in the art, for example a mirror of the type that is lightly silvered on one side. It is preferably disposed between the optical fiber cable 13 and the optical shutter 27 and arranged to reflect a predetermined magnitude of the optical energy of the carrier signal toward the shutter 27 for reflection toward the cable 13, while simultaneously allowing transmission of light energy sufficient for current production by the photovoltaic battery 45. Alternatively, the elements shown in FIG. 5 can be rearranged so that the photovoltaic batteries receive the reflected light energy and the optical shutter 27 receives the light energy directly transmitted through the mirror 43.

Figure 6:
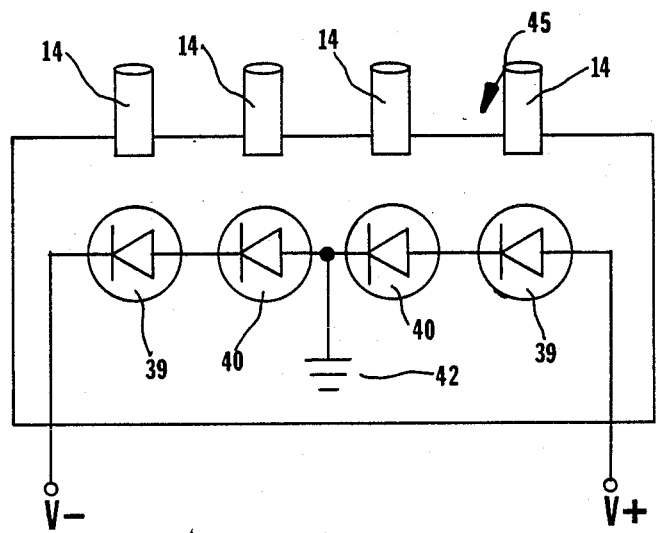
FIG. 6 shows another embodiment of the photovoltaic cell used in the invention.

The photovoltaic battery 45 is of a type known in the art. It has a number of photodetectors 39 and 40 which are typically photodiodes. FIG. 6 shows another embodiment of the photovoltaic battery 45. The photovoltaic battery 45 as shown in FIGS. 5 and 6 is connected to ground 42 and to the DC to DC converter 41. The DC to DC converter 41 boosts the voltage generated by the photovoltaic cell 45 to a magnitude that is required by the amplifier 29. This embodiment of the power source 30 provides a "zero" power remote station 12 configuration, in other words, one which is completely electrically isolated from current in the main station 11.

Alternatively, as shown in FIG. 5, a second fiber 14 supplies continuous optical power and illuminates the photovoltaic batteries. The second optical fiber 14 is connected either to the light source 21 in the main station 11 to receive light energy therefrom or to a separate, additional light source (not shown). As shown in FIG. 5, the optical fiber 14 is in a bent configuration. The optical fiber 14 can be utilized in this manner so long as its minimum bend radius is not exceeded. As shown in FIG. 6, individual second optical fibers 14 can alternatively be directed to each photodetector of the photovoltaic battery 45 in a similar manner.

Figure 7:
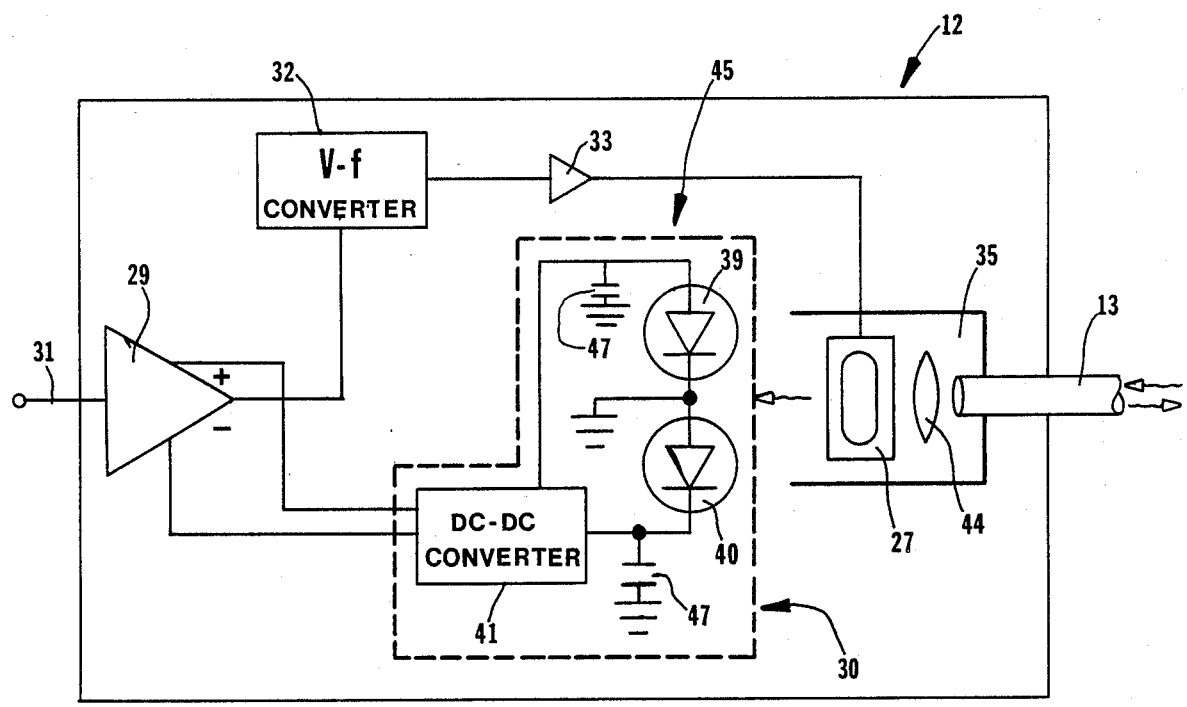
FIG. 7 is a schematic diagram showing another embodiment of the remote station and which is shown to utilize yet another power supply embodiment.

FIG. 7 shows another embodiment of the power source 30 usable in the remote station 12. The shutter 27 is disposed directly between the optical fiber 13 and the power source 30 and is normally open. This embodiment has capacitors 47 connected to the photovoltaic battery 45 to supply continuous electrical power during loss of photovoltaic illumination. The photovoltaic battery 45 provides current for remote station 12 function without requiring light beam splitting.

Figure 8:
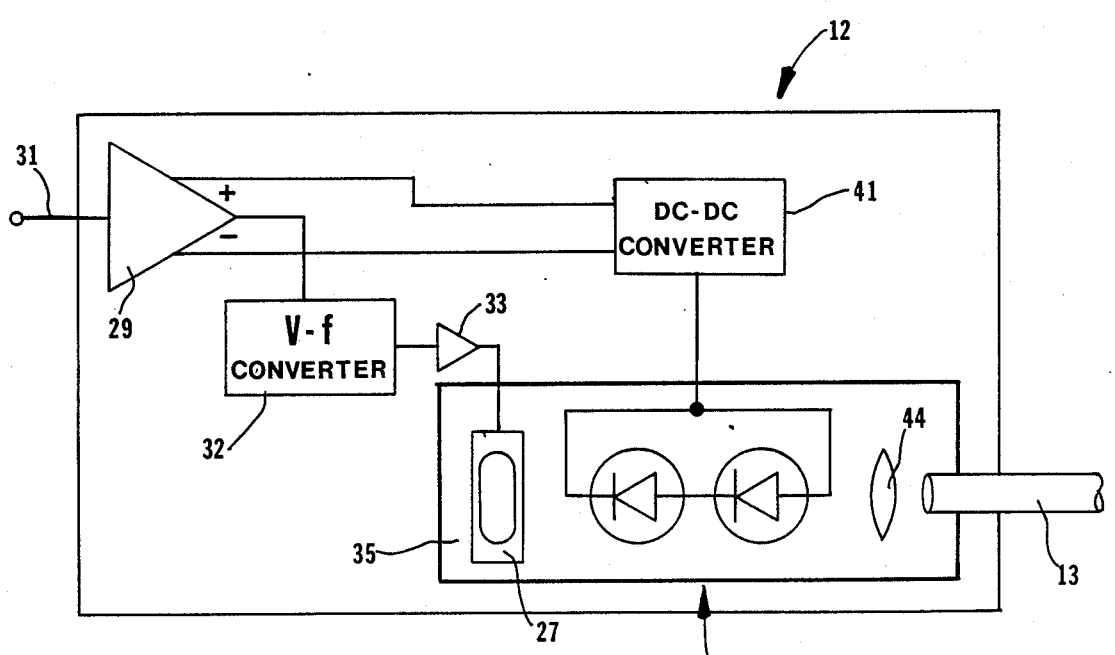
FIG. 8 is a schematic diagram of yet another embodiment of the remote station and which utilizes a further power supply embodiment.

FIG. 8 shows another embodiment of the power source 30 usable in the remote station 12. This embodiment has a transparent photovoltaic battery 45 which utilizes epitaxial gallium aluminum arsenide semiconductor diodes. The transparent photovoltaic battery 45 generates a voltage when exposed to the optical carrier signal emitted from the fiber optic cable 13. The semiconductor battery 45 is extremely thin and has a desirable transmission efficiency for purposes of subsequent signal modulation. Hence, the carrier signal is not appreciably attenuated and may be modulated as described above. The voltage generated by the photovoltaic battery 45 is utilized to provide a "zero" power remote station 12 which is also completely electrically isolated from the main station 11.

As many changes are possible to the embodiments of this invention utilizing the teachings thereof, the descriptions above, and the accompanying drawings should be interpreted in the illustrative and not the limited sense.

That which is claimed is:

1. A signal modulation system comprising:
   a. an optical fiber;
   b. a first station communicatively connected to said optical fiber and having means to transmit an unmodulated light carrier signal through said optical fiber, and first means to convert a modulated light carrier signal from said optical fiber to a demodulated electrical signal for output, said first station further having means to separate said unmodulated light carrier signal and said modulated light carrier signal; and c. a second station communicatively connected to said optical fiber and having at least one terminal to receive an electrical input signal, an amplifier connected to said at least one terminal, a power source connected to said amplifier, a digital modulator connected to said amplifier and converting said input signal to a modulating signal, an optical shutter constructed and arranged to modulate and reflect said unmodulated light carrier signal emitted from said optical fiber back to said optical fiber, said optical shutter being responsive to said modulating signal, and means to direct both said unmodulated light carrier signal emitted from said optical fiber to said optical shutter, and said modulated light carrier signal reflected to said optical fiber.

2. The system of claim 1, wherein said power source comprises a beam splitter constructed and arranged to partially transmit said carrier signal to and from said optical shutter and one or more photovoltaic batteries constructed and arranged to receive carrier signal light energy reflected by said beam splitter.

3. The system of claim 1, wherein said power source comprises a battery.

4. The system of claim 1, wherein said means to separate comprises a partially reflecting mirror constructed and arranged to transmit said unmodulated carrier signal from said means to transmit to said optical fiber and to reflect said modulated carrier signal to said first means to convert.

5. The system of claim 1, wherein said power source comprises a beam splitter constructed and arranged to partially reflect said carrier signal to and from said optical shutter and one or more photovoltaic batteries constructed and arranged to receive carrier signal light energy transmitted through said beam splitter.

6. The system of claim 5, wherein said beam splitter is a partially reflecting mirror.

7. The system of claim 5, wherein said power source additionally comprises a DC to DC converter connected to said photovoltaic batteries.

8. The system of claim 5, wherein said photovoltaic batteries are comprised of at least two diodes.

9. The system of claim 1, wherein said power source comprises a plurality of photovoltaic batteries and wherein a plurality of second optical fibers are arranged to receive said unmodulated light carrier signal from said means to transmit, and to provide optical energy to each of said plurality of photovoltaic batteries.

10. The system of claim 1, wherein said power source comprises one or more transparent photovoltaic batteries disposed in-line with and between said optical shutter and said optical fiber, and wherein said power source additionally comprises a DC to DC converter connected to said photovoltaic batteries.

11. The system of claim 1, wherein said power source comprises one or more photovoltaic batteries disposed posterior to said optical shutter and capacitor means connected to said photovoltaic batteries, and wherein said optical shutter is normally open, and wherein said power source additionally comprises a DC to DC converter connected to said photovoltaic batteries.

12. The system of claim 1, wherein said power source comprises one or more photovoltaic batteries and wherein a second optical fiber is arranged to receive said unmodulated light carrier signal from said means to transmit, and to provide optical energy to said one or more photovoltaic batteries.

13. The system of claim 1, wherein said first means to convert comprises a photodetector, an output circuit connected to said photodetector, a frequency to voltage converter connected to said output circuit and at least one terminal connected to said frequency to voltage converter.

14. The system of claim 1, wherein said digital modulator comprises a voltage to frequency converter connected to said means to receive and a voltage amplifier connected to said voltage to frequency converter.

15. The system of claim 1, wherein said means to transmit comprises a laser diode and a power supply connected to said laser diode.

16. An optical fiber reflective signal modulation system for input of an electrical signal at a location electrically removed from a location at which both an unmodulated optical carrier signal is generated and a demodulated, digital electrical signal having the same characteristics of the input signal is outputted, comprising:

a. an optical fiber transmitting both an unmodulated and a modulated carrier signal;

b. a main station communicatively connected to said optical fiber having an unmodulated optical transmitter transmitting said unmodulated carrier signal through said optical fiber, said transmitter having a light source and a power supply connected to said light source, said main station further having a receiver converting said modulated carrier signal emitted from said optical fiber to a modulated electrical signal, said receiver having a light detector and an output circuit connected to said light detector, said main station further having a demodulator connected to said output circuit for outputting said demodulated electrical signal, and means to separate said unmodulated carrier signal and said modulated carrier signal; and c. a remote station having a high speed, reflective shutter communicatively connected to said optical fiber at its end opposite said main station, said remote station further having means to receive the electrical input signal, a power source connected to said means to receive, a bit serial digital modulator communicatively connected to said means to receive and to said reflective shutter, said modulator receiving the input signal and controlling said reflective shutter, and collimating means constructed and arranged to focus the unmodulated carrier signal emitted from said optical fiber and to focus said modulated carrier signal reflected from said reflective shutter, said power source comprising a beam splitter constructed and arranged to separate said unmodulated light carrier signal into a power signal and a data signal, and one or more photovoltaic batteries constructed and arranged to receive said power signal, said data signal being reflected by said reflective shutter to said optical fiber to provide said modulated light carrier signal.

17. The system of claim 16, wherein the input is a bioelectric signal carrier modulating signal.

18. The system of claim 26, wherein said power source comprises a plurality of photovoltaic batteries and wherein a plurality of second optical fibers are arranged to receive said unmodulated light carrier signal from said optical transmitter, and to provide optical energy to each of said plurality of photovoltaic batteries.

19. The system of claim 16, wherein said light source comprises a laser diode.

20. The system of claim 16, wherein said light detector comprises a photodiode.

21. The system of claim 16, wherein said demodulator comprises frequency to voltage converter.

22. The system of claim 16, wherein said optical fiber is a high power, plastic optical fiber.

23. The system of claim 16, wherein said reflective shutter comprises a fast, uniaxial birefringent liquid crystal.

24. The system of claim 16, wherein said reflective shutter comprises a Kerr cell.

25. The system of claim 16, wherein said reflective shutter comprises a Pockel cell.

26. The system of claim 16, wherein said modulator comprises a voltage to frequency converter connected to said amplifier and a voltage amplifier connected to said voltage to frequency converter and to said reflective shutter.

27. The system of claim 16, wherein said power source additionally comprises a DC to DC converter connected to said photovoltaic batteries.

28. The system of claim 16, wherein said beam splitter comprises a partially reflecting mirror constructed and arranged to reflect said data signal to and from said reflective shutter, and to transmit said power signal to said one or more photovoltaic batteries.

29. The system of claim 16, wherein said beam splitter comprises a partially reflecting mirror constructed and arranged to transmit said data signal to and from said reflective shutter, and to reflect said power signal to said one or more photovoltaic batteries.

30. The system of claim 16, wherein said means to receive comprises at least one terminal and an amplifier.

31. A signal modulation system comprising:
 a. an optical fiber;
 b. a first station communicatively connected to said optical fiber and having means to transmit an unmodulated light carrier signal through said optical fiber, first means to convert a modulated light carrier signal from said optical fiber to a demodulated electrical signal for output and means to separate said unmodulated light carrier signal and said modulated light carrier signal; and
 c. a second station communicatively connected to said optical fiber and having means to receive an input signal, second means to convert said input signal to a modulating signal, an electro-optical reflection means constructed and arranged to modulate reflection of said unmodulated light carrier signal emitted from said optical fiber back to said optical fiber, said electro-optical reflection means being responsive to said modulating signal, and means to direct said unmodulated light carrier signal emitted from said optical fiber and said modulated light carrier signal reflected to said optical fiber, said second station further comprising a power source connected to said means to receive and having one or more photovoltaic batteries disposed posterior to said electro-optical reflection means, capacitor means and a DC to DC converter connected to said photovoltaic battery, and wherein said electro-optical reflection means is normally open.

* * * * *